Patented Apr. 30, 1935

UNITED STATES PATENT OFFICE 1,999,395

COLOR LAKE

William S. Calcott and Paul W. Carleton, Pennsgrove, N. J., and Harvey I. Stryker, Wilmington, Del., assignors to E. I. du Pont de Nemours & Company, Wilmington, Del., a corporation of Delaware No Drawing. Application May 27, 1930, Serial No. 456,288

20 Claims. (Cl. 260—11)

This invention relates to color lakes of basic dyestuffs and more particularly it relates to such materials containing alkylamino compounds.

In British Patent 275,943, compounds are disclosed which may be called or are, at least, similar to color lakes and which are formed by the reaction of complex inorganic acids with compounds which are not dyestuffs.

In British Patent 299,521, color lakes are obtained which are very fast to light by the use of a mixture of basic dyestuffs with compounds which are not dyestuffs themselves (see the compounds named in Patent 275,943 supra), but which form colored compounds with the complex inorganic acids used to produce the lakes. Examples of these basic nuclear compounds are para-amino-benzaldehyde and p:p'-tetramethyl-diamino-benzhydrol.

It is an object of this invention to produce novel color lakes. Further objects are to produce new color lakes of basic dyestuffs with complex inorganic acids, to produce lakes containing colorless alkylamino-compounds and to produce basic dyestuffs color lakes which have improved fastness to light. Other objects will appear hereinafter.

These objects are accomplished by the present invention according to which a color lake is produced by an admixture of a basic dyestuff, a complex inorganic acid and an alkyl amine.

The invention will be readily understood from a consideration of the following examples:

Example I

Sixty-seven and six-tenths (67.6) parts of sodium tungstate, 8.4 parts of dibasic sodium phosphate, and 47 parts of concentrated hydrochloric acid are dissolved in 750 parts of water and boiled 15 minutes. To this hot solution (95° C. or above) is added a hot solution of 15 parts of Victoria blue B conc. and 1.5 parts of dibutylamine hydrochloride in 1500 parts of water. The resulting suspension of the color lake is filtered and washed free of water-soluble impurities.

The temperature at which the mixture is prepared may be varied from room temperature to the boiling point.

Example II

Sixty-three and three-tenths (63.3) parts of sodium tungstate, 8.4 parts of dibasic sodium phosphate, and 41 parts of concentrated hydrochloric acid are dissolved in 750 parts of water and boiled 15 minutes. To this hot solution is added a hot solution of 18 parts of ethyl violet and 3 parts of tri-propylamine hydrochloride in 1500 parts of water. The resulting suspension is treated as in Example I. The procedure may be modified as stated in Example I.

Example III

Eighteen (18) parts of ethyl violet are dissolved in 1500 parts of water at 90–95° C. To this solution is added 3 parts of dibutylamine as the hydrochloride followed by 60 parts of phospho luteo tungstic acid in 500 parts of water. The resulting suspension is treated as in, and may be varied similarly to, Example I.

Example IV

Two hundred (200) parts of the phosphotungstate of dibutylamine and 100 parts of the phosphotungstate of ethyl violet are intimately mixed. The resulting lake is treated as in Example I. The proportions may be varied in any desired manner.

These lakes may be prepared by admixing the complex acid with the dye and alkylamine in any desired amounts, but acid conditions are maintained in the process of admixture. Accordingly any soluble salt of the complex acid may be used in the preparation, and the alkylamine or dye can be added in any suitable form provided the acid condition referred to is maintained. A convenient method of maintaining this condition is to add the alkylamine in the form of its hydrochloride as was done in the specific examples above.

Various complex inorganic acids may be used. In addition to those mentioned in the specific examples above, the following merit special mention; phospho-luteo-tungstic, phospho-duo-decitungstic, phospho-molybdic and silico tungstic. The phospho-molybdo-tungstic acid of U. S. Patent 1,653,851 (British Patent 216,486) of December 27, 1927, to Hartman is also suitable. Satisfactory results may be obtained with the complex acids in a reduced form such as described in U. S. Patent 1,731,081 of October 8, 1929 to Rabe, Wenk and Hartmann, and British Patent 292,253.

Any basic dyestuff may be used. Particularly good results have been obtained with triaminotriphenyl-methane dyestuffs (such as ethyl violet—color index 682), diamino-triphenylmethane dyestuffs (such as Victoria green color index No. 657), triamino-diphenyl-naphthylmethane dyestuffs (such as Victoria blue B—color index 729). Such basic dyestuffs as rhodamine B extra (color index No. 749) may also be used successfully.

Considerable variation is permissible in the particular akylamine used. In addition to the dibutylamine and tripropylamine, of the above examples any primary, secondary or tertiary alkylamine may be used. Preferred compounds are butylamine, isobutylamine, secondary butylamine, dibutylamine, dipropylamine, di-isobutylamine, di-isoamylamine and tripropylamine. Excellent results have been obtained with dibutylamine. Mixtures of alkylamines may be used if desired.

The order of addition of the various components is unimportant. The dyestuff solution may be first added to the complex acid solution, followed by the alkylamine; the alkylamine may be added first, followed by the dyestuff; the complex acid may be added to the solution of the other components of the final lake or a combination of alkylamine plus complex acid may be admixed with a complex acid already combined with the dye.

The temperature is unimportant and the lake may be prepared at ordinary or elevated temperatures.

When desired the lake may be precipitated on a substratum (for example, barium sulfate, hydrated aluminum oxide etc.) in any desired or customary manner.

These new color lakes are suitable for any purpose to which ordinary color lakes are now put.

These new color lakes have the advantage of exceptional light fastness.

As many apparent and widely different embodiments of this invention may be made without departing from the spirit and scope thereof, it is to be understood that we do not limit ourselves to the specific embodiments thereof except as defined in the appending claims.

We claim:

1. The process which comprises mixing a basic dyestuff, a complex inorganic acid of the group consisting of phospho-luteo-tungstic and phospho duo-deci-tungstic and an alkylamine.

2. The substance substantially identical with the solid of the resultant of reacting a basic dyestuff, an alkylamine and a complex inorganic acid of the group consisting of phospho-tungstic, phospho-molybdic, phospho-tungsto-molybdic, and silico-tungstic acids.

3. Color lakes comprising essentially an admixture of one or more complex inorganic acids of the group consisting of phospho-tungstic, phospho-molybdic, phospho-tungsto-molybdic, and silico-tungstic acids, a basic dyestuff and an alkyl amine.

4. Color lakes comprising essentially an admixture of one or more complex inorganic acids of the group consisting of phospho-tungstic, phospho-molybdic, phospho-tungsto-molybdic, and silico-tungstic acids, a basic dyestuff and a secondary alkyl amine.

5. Color lakes comprising essentially an admixture of one or more complex inorganic acids of the group consisting of phospho-tungstic, phospho-molybdic, phospho-tungsto-molybdic, and silico-tungstic acids, a basic dyestuff and a butyl amine.

6. Color lakes comprising essentially an admixture of one or more complex inorganic acids of the group consisting of phospho-tungstic, phospho-molybdic, phospho-tungsto-molybdic, and silico-tungstic acids, a basic dyestuff and a secondary butyl amine.

7. Color lakes comprising essentially an admixture of one or more complex inorganic acids of the group consisting of phospho-tungstic, phospho-molybdic, phospho-tungsto-molybdic, and silico-tungstic acids, a basic dyestuff and a secondary butyl alkyl amine.

8. Color lakes resulting from an admixture of one or more complex inorganic acids of the group consisting of phospho-tungstic, phospho-molybdic, phospho-tungsto-molybdic, and silico-tungstic acids, a basic dyestuff and a dibutyl amine.

9. Color lakes resulting from an admixture of a tungsten containing acid, a basic dyestuff and a dibutyl amine.

10. Color lakes resulting from an admixture of a phospho-tungstic-acid, a basic dyestuff and a dibutyl amine.

11. The process of preparing color lakes comprising combining a solution of a complex inorganic acid containing one or more metals of the group consisting of tungsten and molybdenum with a solution of a basic dyestuff and an alkyl amine-hydrochloride.

12. The process of preparing color lakes comprising combining a solution of a complex inorganic acid containing one or more metals of the group molybdenum and tungsten and in addition an element of the group consisting of phosphorus, silicon, arsenic and antimony with a solution of a basic dyestuff and adding to the resultant a solution of an alkyl amine-hydrochloride.

13. The process of preparing color lakes comprising combining a solution of a complex inorganic acid containing one or more metals of the group tungsten and molybdenum and the anhydride of an acid of the group consisting of phosphoric acid and silicic acid, with a solution of a basic dyestuff and an alkyl amine-hydrochloride.

14. The product resulting from the process comprising combining a solution of a complex inorganic acid containing one or more metals of the group tungsten and molybdenum and the anhydride of an acid of the group consisting of phosphoric acid and silicic acid, with a solution of a basic dyestuff and an alkyl amine-hydrochloride.

15. The product resulting from the process comprising combining a solution of a complex inorganic acid containing one or more metals of the group molybdenum and tungsten and in addition an element of the group consisting of phosphorus, silicon, arsenic and antimony, with a solution of a basic dyestuff and adding to the resultant a solution of an alkyl amine-hydrochloride.

16. The product resulting from the process comprising combining a solution of a complex inorganic acid containing one or more metals of the group consisting of tungsten and molybdenum with a solution of an alkyl amine-hydrochloride and adding to the resultant a solution of basic dyestuff.

17. Color lakes comprising essentially the reaction resultant of an admixture of one or more complex inorganic acids of the group consisting of phospho-tungstic, phospho-molybdic, phospho-tungsto-molybdic, and silico-tungstic acids, a basic dyestuff and an alkyl amine.

18. The process which comprises mixing a basic dyestuff, a complex inorganic acid containing one or more members of the group consisting of tungsten and molybdenum and an alkyl amine.

19. The substance substantially identical with the solid resultant of reacting a basic dyestuff, an alkyl amine and a complex inorganic acid containing one or more metals of the group consisting of tungsten and molybdenum.

20. Color lakes comprising essentially an admixture of one or more complex inorganic acids of the group consisting of phospho-tungstic, phospho-molybdic, phospho-tungsto-molybdic, and silico-tungstic acids, a basic dyestuff and a secondary alkyl amine.

WILLIAM S. CALCOTT.
PAUL W. CARLETON.
HARVEY I. STRYKER.